(12) United States Patent
Sakurai et al.

(10) Patent No.: US 8,749,324 B2
(45) Date of Patent: Jun. 10, 2014

(54) SIGNAL TRANSMISSION APPARATUS AND DISPLAY APPARATUS

(75) Inventors: Hisao Sakurai, Saitama (JP); Katsuhisa Ito, Tokyo (JP); Izushi Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 355 days.

(21) Appl. No.: 13/271,470

(22) Filed: Oct. 12, 2011

(65) Prior Publication Data

US 2012/0092093 A1    Apr. 19, 2012

(30) Foreign Application Priority Data

Oct. 19, 2010  (JP) ................................ 2010-234503

(51) Int. Cl.
*H01P 1/06*   (2006.01)
*H04N 5/225*  (2006.01)

(52) U.S. Cl.
USPC ...................................... 333/256; 348/333.06

(58) Field of Classification Search
USPC ............... 333/256, 257, 261; 348/51, 333.01, 348/333.06, 369, 739
See application file for complete search history.

(56) References Cited

U.S. PATENT DOCUMENTS 7,573,502 B2 *   8/2009   Sassa ......................... 348/211.2
2011/0069157 A1 *  3/2011   Ito et al. ......................... 348/51

FOREIGN PATENT DOCUMENTS

JP    2004-177709    6/2004
JP    2005-114771    4/2005

* cited by examiner

*Primary Examiner* — Dean O Takaoka
(74) *Attorney, Agent, or Firm* — Dentons US LLP (57) ABSTRACT

The present disclosure provides a signal transmission apparatus for transmitting a signal to a signal processing section provided inside a rotated rotary body, the signal transmission apparatus including: a waveguide tube provided on the rotating shaft of the rotary body; a signal transmitting section provided outside the rotary body to serve as a section for transmitting the signal through the waveguide tube; a signal receiving section provided inside the rotary body to serve as a section for receiving the signal transmitted by the signal transmitting section through the waveguide tube and supplying the signal to the signal processing section; a slip ring rotated along with the rotary body around the waveguide tube serving as a rotation axis; and a power supplying section provided outside the rotary body to serve as a section for supplying power to the signal processing section through the slip ring.

14 Claims, 8 Drawing Sheets

SIGNAL TRANSMISSION APPARATUS AND DISPLAY APPARATUS

BACKGROUND

The present disclosure relates to a signal transmission apparatus and a display apparatus. More particularly, the present disclosure relates to a signal transmission apparatus and a display apparatus provided with functions of the signal transmission apparatus to serve as a display apparatus suitable for displaying an image 3-dimensionally visible from all surrounding directions.

There is an existing 3-dimensional display technology for displaying a 3-dimensionally visible image on a planar display section employed in an apparatus such as a television receiver. This technology typically adopts a disparity between the left and right eyes of the viewer watching what is displayed on the planar display section. To put it concretely, for example, images for the left eye are displayed on the planar display section alternately with images for the right eye. In addition, by letting image light beams propagate through polarization filters or the like, the left eye can see only images for the left eye whereas the right eye can see only images for the right eye so that a binocular vision can be implemented.

On the other hand, there has been proposed a number of entire-circumference 3-dimensional image display apparatus each used for displaying an image of an object in such a way that the object is 3-dimensionally visible when seen from any of all surrounding directions. In this case, the entire-circumference 3-dimensional image display apparatus displays a plurality of observing-point images subjected to an imaging operation from a plurality of observing points provided on a circumference having a center coinciding with the object. The observing-point images are images having observing points different from each other. Instead of obtaining the observing-point images by an imaging operation, the observing-point images may also be generated by adoption of computer graphics on the assumption of a state of seeing the object from the entire-circumference. For more information on such entire-circumference 3-dimensional image display apparatus, the reader is advised to refer to documents such as Japanese Patent Laid-Open Nos. 2004-177709 and 2005-114771.

In such entire-circumference 3-dimensional image display apparatus, a display section has a case with a cylindrical shape and, inside the case, a number of small-size LEDs (Light Emitting Devices) or the like are placed. Slits are provided on the case and an image on the display section can be seen from positions outside the case through the slits. In addition, by letting the case be rotated at a high speed by making use of a motor, for a user looking at the side surface of the case having the cylindrical shape from any direction, an image on the display screen can be seen 3-dimensionally.

SUMMARY

As described above, in the entire-circumference 3-dimensional image display apparatus, the case having a cylindrical shape is rotated at a high speed by making use of a motor. Thus, it is necessary to supply driving power and an image signal to sections provided inside the case to serve as a signal processing section, a display section and other sections.

In order to supply driving power and an image signal to such sections provided inside the case, for example, it is possible to adopt a conceivable method by which a battery for generating the driving power and a memory for storing the image signal are provided inside the case. In accordance with such a method, however, the length of time it takes to continuously display the 3-dimensional image is inevitably limited by the electrical-charge accumulation capacity of the battery and the storage capacity of the memory.

In order to continuously display different 3-dimensional images, it is necessary to provide a method for continuously and stably supplying the driving power and the image signal without interruptions from sources outside the case to the aforementioned sections inside the case. However, such a method has not been established.

It is thus desirable to provide a method for continuously and stably supplying the driving power and the image signal without interruptions from sources outside the case rotated at a high speed to the aforementioned sections inside the case.

A signal transmission apparatus provided in accordance with a first embodiment of the present disclosure to serve as a signal transmission apparatus for transmitting a signal to a signal processing section placed inside a rotated rotary body employs: a waveguide tube provided on the rotating shaft of the rotary body; and a signal transmitting section provided outside the rotary body to serve as a section for transmitting the signal through the waveguide tube. The signal transmission apparatus further employs: a signal receiving section provided inside the rotary body to serve as a section for receiving the signal transmitted by the signal transmitting section through the waveguide tube and supplying the signal to the signal processing section; a slip ring rotated along with the rotary body around the waveguide tube serving as the rotation axis; and a power supplying section provided outside the rotary body to serve as a section for supplying power to the signal processing section through the slip ring.

It is possible to provide a configuration in which the signal transmission apparatus according to the first embodiment of the present disclosure is further provided with a power-line joining section for joining power lines between the slip ring and the signal processing section in a non-fixing manner.

It is also possible to provide a configuration in which the signal transmission apparatus according to the first embodiment of the present disclosure is further provided with an aerial motor placed inside the rotary body to function as a motor for rotating the rotary body and the slip ring around the waveguide tube serving as the rotation axis.

It is also possible to provide a configuration in which the signal transmission apparatus according to the first embodiment of the present disclosure is further provided with a motor placed inside the rotary body to function as a motor for rotating the rotary body and the slip ring around the waveguide tube serving as the rotation axis through a power transfer section.

It is also possible to provide a configuration in which the signal transmitting section and the signal receiving section make use of millimeter waves in communications of the signal.

It is also possible to provide a configuration in which the signal transmission apparatus according to the first embodiment of the present disclosure is further provided with a polarized-wave conversion section provided inside the waveguide tube to serve as a section for changing the polarized-wave direction of the signal communicated between the signal transmitting section and the signal receiving section.

As described above, in the signal transmission apparatus according to the first embodiment of the present disclosure, a signal is communicated between the signal transmitting section and the signal receiving section through the waveguide tube provided on the rotating shaft of the rotary body. In addition, the power supplying section supplies power to the signal processing section through the slip ring rotated along with the rotary body around the waveguide tube serving as the rotation axis.

A signal transmission apparatus provided in accordance with a second embodiment of the present disclosure to serve as a signal transmission apparatus for transmitting a signal to a signal processing section provided inside a rotated rotary body employs: a waveguide tube provided on the rotating shaft of the rotary body; a slip ring rotated along with the rotary body around the waveguide tube serving as a rotation axis; and a power supplying section provided outside the rotary body to serve as a section for supplying power to the signal processing section through the slip ring.

A display apparatus according to a third embodiment of the present disclosure employs: a display section provided inside a rotated rotary body; a signal processing section provided inside the rotated rotary body to serve as a section for supplying an image signal to the display section; a waveguide tube provided on the rotating shaft of the rotary body; and a signal transmitting section provided outside the rotary body to serve as a section for transmitting the image signal through the waveguide tube. The display apparatus further employs: a signal receiving section provided inside the rotary body to serve as a section for receiving the image signal transmitted by the signal transmitting section through the waveguide tube and supplying the image signal to the signal processing section; a slip ring rotated along with the rotary body around the waveguide tube serving as the rotation axis; and a power supplying section provided outside the rotary body to serve as a section for supplying power to the display section and the signal processing section through the slip ring.

As described above, in the display apparatus according to the third embodiment of the present disclosure, an image signal is communicated between the signal transmitting section and the signal receiving section through the waveguide tube provided on the rotating shaft of the rotary body. In addition, the power supplying section supplies power to the display section and the signal processing section through the slip ring rotated along with the rotary body around the waveguide tube serving as the rotation axis.

In accordance with the first embodiment of the present disclosure, driving power and a signal can be continuously supplied in a stable manner.

In accordance with the third embodiment of the present disclosure, an image can be displayed continuously in a stable manner.

DETAILED DESCRIPTION OF THE PREFERRED EMBODIMENTS

Most preferred embodiments of the present disclosure are described below in detail by referring to the diagrams.

[Typical Configuration of 3-Dimensional Image Display System]

Figure 1:
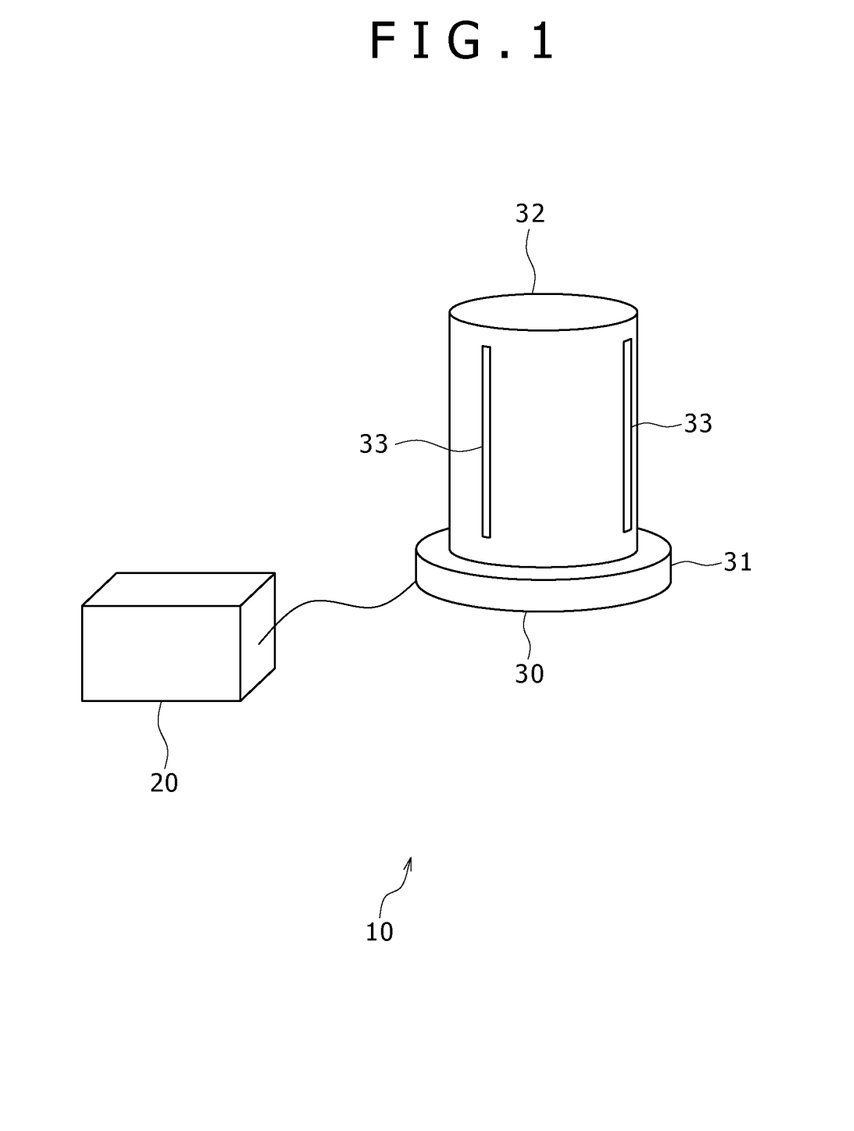
FIG. 1 is a diagram showing a typical configuration of a 3-dimensional image display system according to an embodiment of the present disclosure.

FIG. 1 shows a typical configuration of a 3-dimensional image display system 10 according to an embodiment of the present disclosure.

As shown in the figure, the 3-dimensional image display system 10 is configured to include an image-signal processing apparatus 20 and an entire-circumference 3-dimensional image display apparatus 30.

The image-signal processing apparatus 20 supplies an image signal obtained typically as a result of an imaging operation carried out on an object from all circumference directions to the entire-circumference 3-dimensional image display apparatus 30.

The entire-circumference 3-dimensional image display apparatus 30 is configured to include a base 31 and a cylindrical section 32. The base 31 supplies driving power to the cylindrical section 32 rotated at a high speed by an aerial motor 44 embedded in the cylindrical section 32. In addition, the base 31 passes on an image signal received from the image-signal processing apparatus 20 to the cylindrical section 32. On the side surface of the cylindrical section 32, a plurality of slits 33 are provided. Inside the cylindrical section 32, the aerial motor 44 having a common rotating shaft shared with the cylindrical section 32 is fixed. In addition, in the cylindrical section 32, a cylinder signal processing section 51 and a display section 52 are embedded as shown in FIG. 2.

[First Typical Internal Configurations of the Base 31 and the Cylindrical Section 32]

First typical internal configurations of the base 31 and the cylindrical section 32 are explained by referring to FIGS. 2 to 4 as follows.

Figure 2:
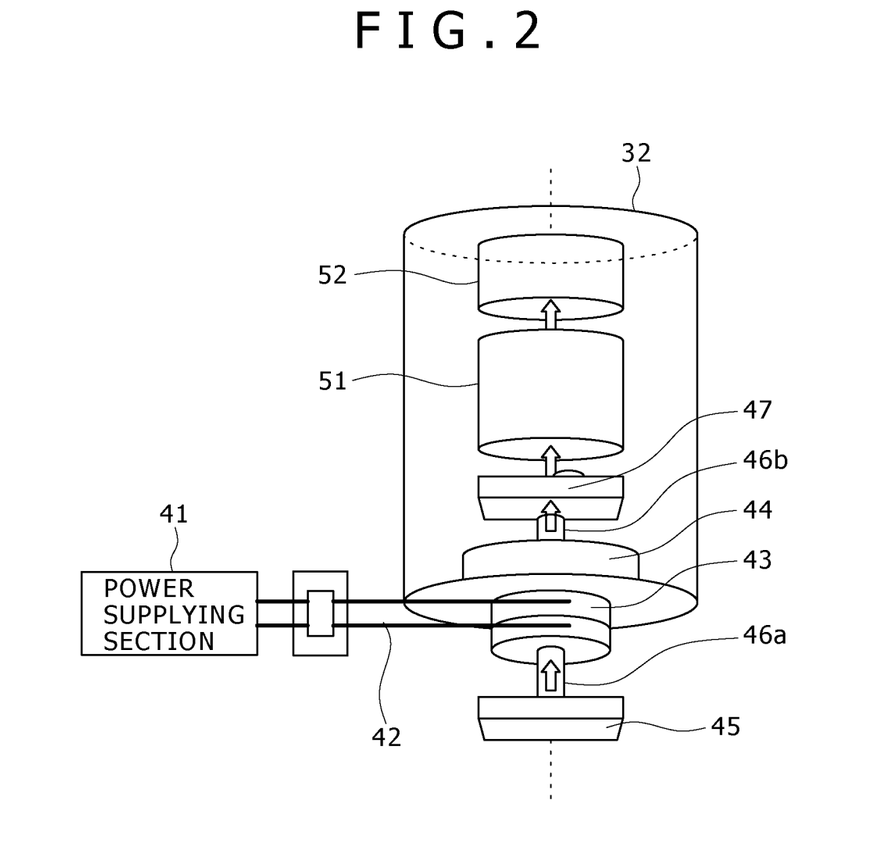
FIG. 2 is a 3-dimensional diagram showing first typical internal configurations of a cylindrical section and a base.
Figure 3:
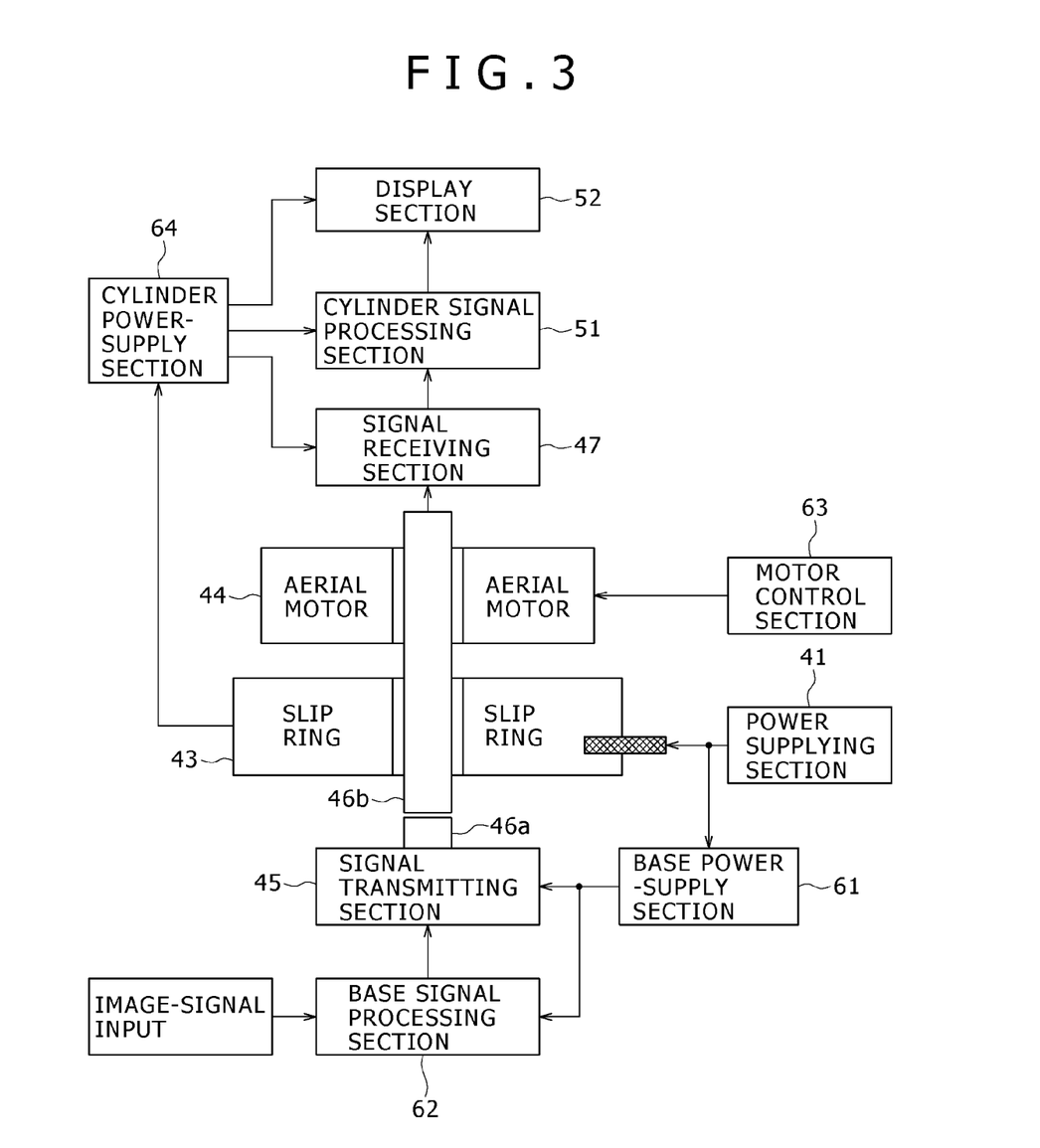
FIG. 3 is a block diagram showing the first typical internal configurations of the cylindrical section and the base.

FIG. 2 is a 3-dimensional diagram showing the first typical internal configurations of the cylindrical section 32 and the base 31 whereas FIG. 3 is a block diagram showing the first typical internal configurations of the cylindrical section 32 and the base 31. On the other hand, FIG. 4 is a cross-sectional diagram showing the first typical internal configurations of the cylindrical section 32 and the base 31.

The base 31 includes a power supplying section 41, a brush 42, a lower waveguide tube 46a, a signal transmitting section 45, a base power-supply section 61 and a base signal processing section 62.

The power supplying section 41 supplies power to a slip ring 43 composing the cylindrical section 32 through the brush 42. In addition, the power supplying section 41 also supplies power to the base power-supply section 61. The brush 42 is electrically connected to the slip ring 43 in an aerial state and the power supplying section 41. The slip ring 43 is rotated at a high speed along with the aerial motor 44.

The lower waveguide tube 46a fixed on the base 31 is joined to an upper waveguide tube 46b through a non-contact junction. The upper waveguide tube 46b is rotated at a high speed along with the cylindrical section 32 around the rotation axis of the cylindrical section 32. The lower waveguide tube 46a forms a waveguide tube 46 in conjunction with the upper waveguide tube 46b.

The signal transmitting section 45 transmits an image signal from an antenna 71 provided inside the lower waveguide tube 46a to a signal receiving section 47 employed in the cylindrical section 32 by way of the waveguide tube 46. In communications between the signal transmitting section 45 and the signal receiving section 47, circular polarized millimeter waves are used. As shown in FIG. 4, a junction between the lower waveguide tube 46a and the upper waveguide tube 46b has a choke flange structure 73. The choke flange structure 73 prevents the millimeter waves from leaking from the junction between the lower waveguide tube 46a and the upper waveguide tube 46b.

It is to be noted that, in the communications between the signal transmitting section 45 and the signal receiving section 47, it is also possible to make use of an electro-magnetic wave signal other than the millimeter waves or an optical signal such as a laser beam. If an optical signal is used, a fiber and a lens are used in place of the waveguide tube 46.

The base power-supply section 61 supplies power to the signal transmitting section 45 and the base signal processing section 62 which are employed in the base 31. The base signal processing section 62 carries out processing determined in advance on an image signal received from the image-signal processing apparatus 20 and supplies the result of the processing to the signal transmitting section 45.

The cylindrical section 32 employs the slip ring 43, the aerial motor 44, the signal receiving section 47, the cylinder signal processing section 51, the display section 52, a motor control section 63 and a cylinder power-supply section 64.

The slip ring 43 receives power from the power supplying section 41 through the brush 42 and passes on the power to the aerial motor 44. In addition, the slip ring 43 supplies the power also to the cylinder power-supply section 64 through a power line 84.

In accordance with control carried out by the motor control section 63, the aerial motor 44 fixed in the cylindrical section 32 rotates the cylindrical section 32 at a high speed around the waveguide tube 46 serving as a rotation axis. The signal receiving section 47 receives an image signal transmitted by the signal transmitting section 45 from an antenna 72 provided inside the upper waveguide tube 46b and passes on the signal to the cylinder signal processing section 51. The cylinder signal processing section 51 carries out processing determined in advance on the image signal received from the signal receiving section 47 and supplies the result of the processing to the display section 52.

The display section 52 is configured to have as many display units as the slits 33. The entire-circumference 3-dimensional image display apparatus 30 displays images of an image signal on the display units in an order determined in advance. The image signal is a signal seen from observing points of the entire circumference surrounding the object of the imaging operation and supplied by the image-signal processing apparatus 20.

The motor control section 63 controls the rotation of the aerial motor 44. The cylinder power-supply section 64 supplies power received through the slip ring 43 to the signal receiving section 47, the cylinder signal processing section 51 and the display section 52 as driving power.

In accordance with the first typical configuration described above, by supplying power through the slip ring 43, the power can be supplied to the cylindrical section 32, which is rotating at a high speed, in a stable manner. In addition, since the aerial waveguide tube 46 is provided inside the rotating shaft of the cylindrical section 32, the image signal can be communicated by adoption of a radio technique in a stable manner. On top of that, since the aerial motor 44 having a common rotating shaft shared with the cylindrical section 32 is embedded in the cylindrical section 32, the size of the entire-circumference 3-dimensional image display apparatus 30 can be made small in comparison with a second typical configuration to be explained later.

[Typical Modified Versions of the First Typical Internal Configurations of the Cylindrical Section 32 and the Base 31]

Next, the following description explains typical modified versions of the first typical internal configurations of the cylindrical section 32 and the base 31.

Figure 5:
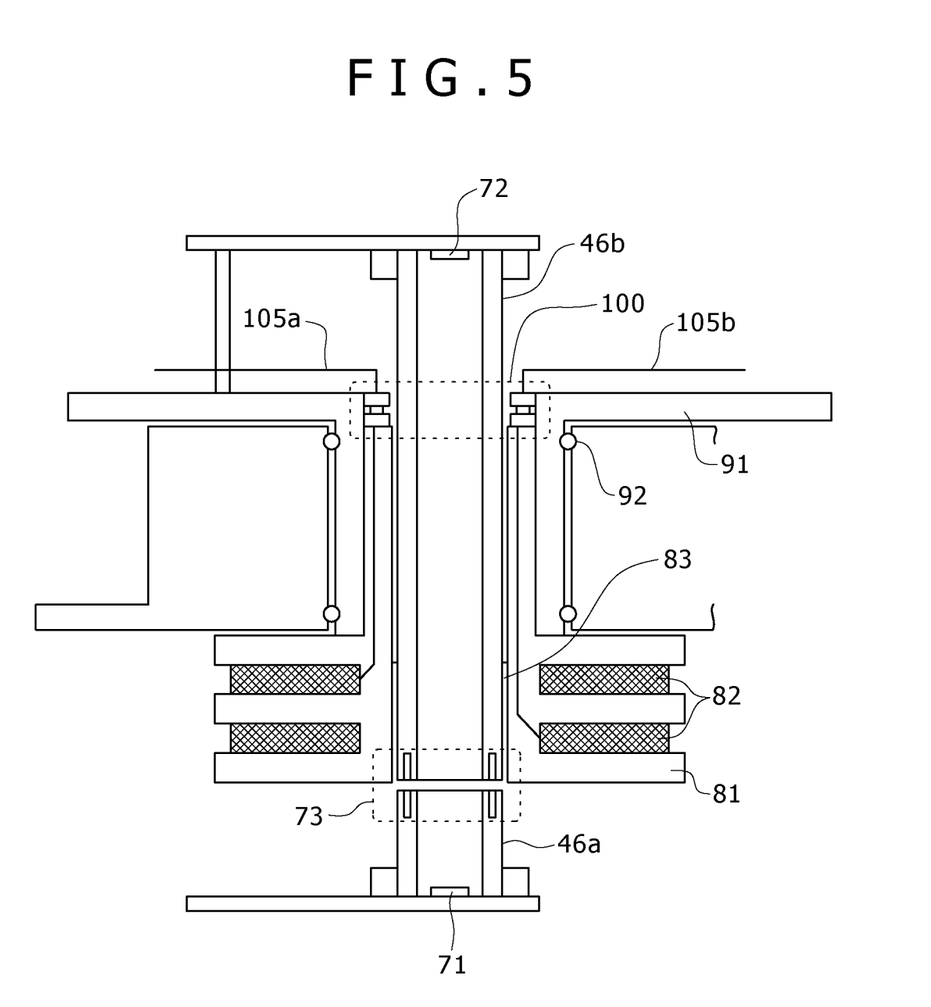
FIG. 5 is a cross-sectional diagram showing a first typical modified version of the first typical internal configurations of the cylindrical section and the base.

FIG. 5 is a cross-sectional diagram showing a first typical modified version of the first typical internal configurations of the cylindrical section 32 and the base 31.

Figure 4:
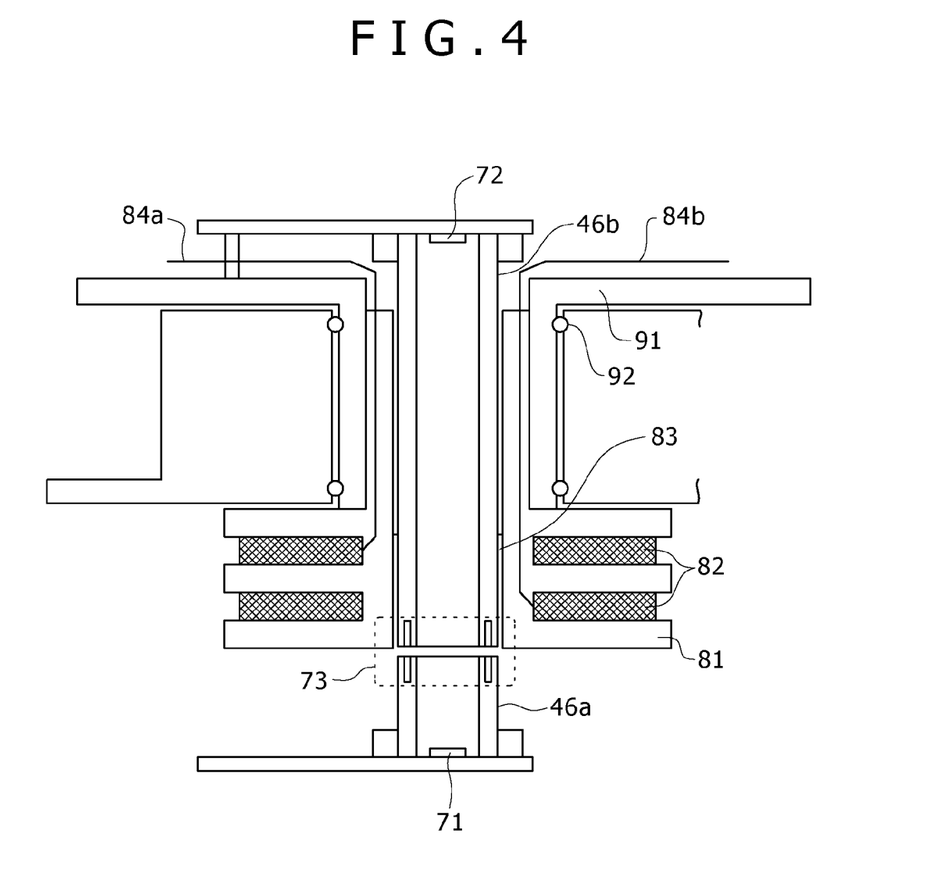
FIG. 4 is a cross-sectional diagram showing the first typical internal configurations of the cylindrical section and the base.

In comparison with the first typical configurations shown in FIG. 4, the first typical modified version includes an additional power-line joining section 100 provided on the power line 84 for supplying power from the slip ring 43 to the cylinder power-supply section 64.

Figure 6:
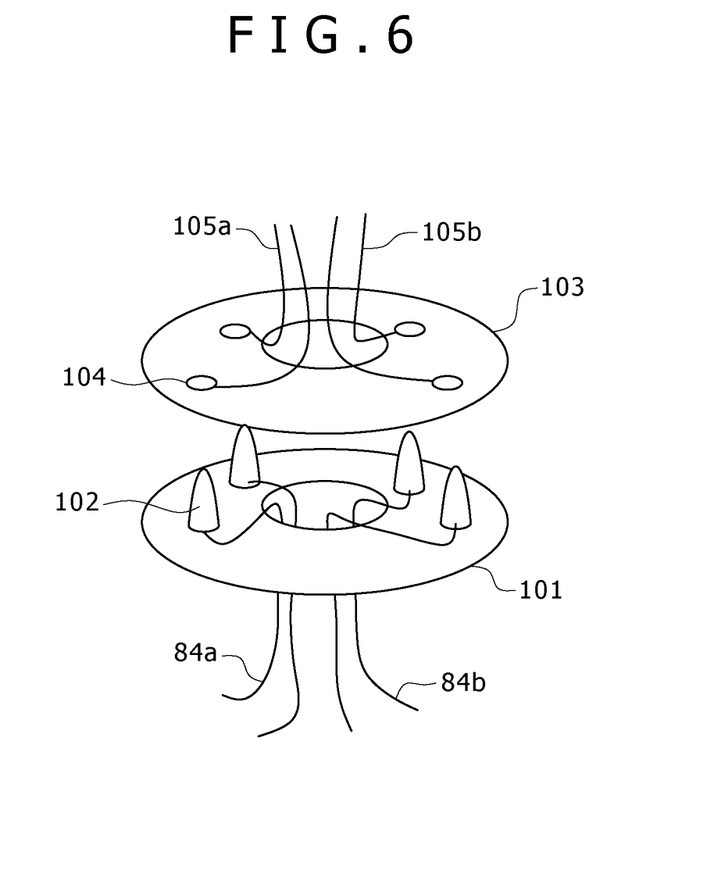
FIG. 6 is a 3-dimensional diagram showing a typical configuration of a power-line joining section.

FIG. 6 shows details of the power-line joining section 100. The power-line joining section 100 is composed of a first electrode substrate 101 and a second electrode substrate 103 which are facing each other. A surface of the first electrode substrate 101 is exposed to the second electrode substrate 103. On this surface, first electrode sections 102 are provided. Each of the first electrode sections 102 is connected to the power line 84 wired to the slip ring 43. On the other hand, a surface of the second electrode substrate 103 is exposed to the first electrode substrate 101. Positions on this surface are each brought into contact with one of the first electrode sections 102. At each of these positions, a second electrode section 104 is provided. Each of the second electrode sections 104 is connected to a power line 105 wired to the cylinder power-supply section 64.

It is to be noted that, as shown in FIG. 6, each of the second electrode sections 104 is a dent whereas each of the first electrode sections 102 is a protrusion or vice versa. As an alternative, each of the second electrode sections 104 and each of the first electrode sections 102 can be created into such shapes that each of the second electrode sections 104 can be engaged with one of the first electrode sections 102 and disengaged from one of the first electrode sections 102 with ease.

Even though the first electrode substrate 101 is not fixed on the second electrode substrate 103 by adoption of the soldering technique or the like, each of the first electrode sections 102 is engaged with one of the second electrode sections 104. Thus, power received by the slip ring 43 is supplied to the cylinder power-supply section 64 by way of the power line 84, a first electrode section 102, a second electrode section 104 and the power line 105.

By providing such a power-line joining section 100, it is easy to change the slip ring 43 which needs to be replaced due to typically abrasion in comparison with a configuration not including the power-line joining section 100.

Figure 7:
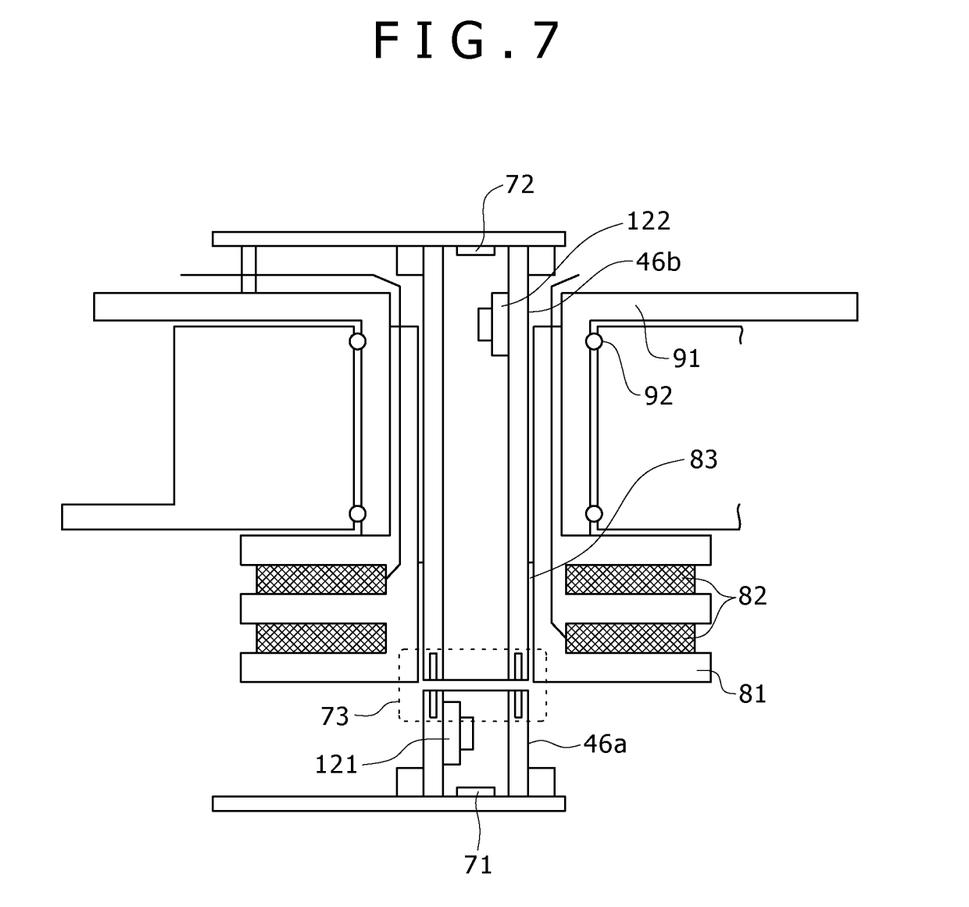
FIG. 7 is a cross-sectional diagram showing a second typical modified version of the first typical internal configurations of the cylindrical section and the base.

FIG. 7 is a cross-sectional diagram showing a second typical modified version of the first typical internal configurations of the cylindrical section 32 and the base 31.

In comparison with the first typical configurations shown in FIG. 4, the second typical modified version includes additional polarized-wave conversion sections 121 and 122 inside the waveguide tube 46. In this case, the antenna 71 employed in the lower waveguide tube 46a transmits an image signal as straight-line polarized waves whereas the polarized-wave conversion sections 121 converts the straight-line polarized waves into circular polarized waves. On the other hand, the polarized-wave conversion sections 122 converts circular polarized waves of a transmitted signal into straight-line polarized waves whereas the antenna 72 employed in the upper waveguide tube 46*b* receives the straight-line polarized waves.

It is to be noted that the first typical modified version can be combined with the second typical modified version.

[Second Typical Internal Configurations of the Base 31 and the Cylindrical Section 32]

Next, second typical internal configurations of the base 31 and the cylindrical section 32 are explained by referring to FIG. 8 as follows.

Figure 8:
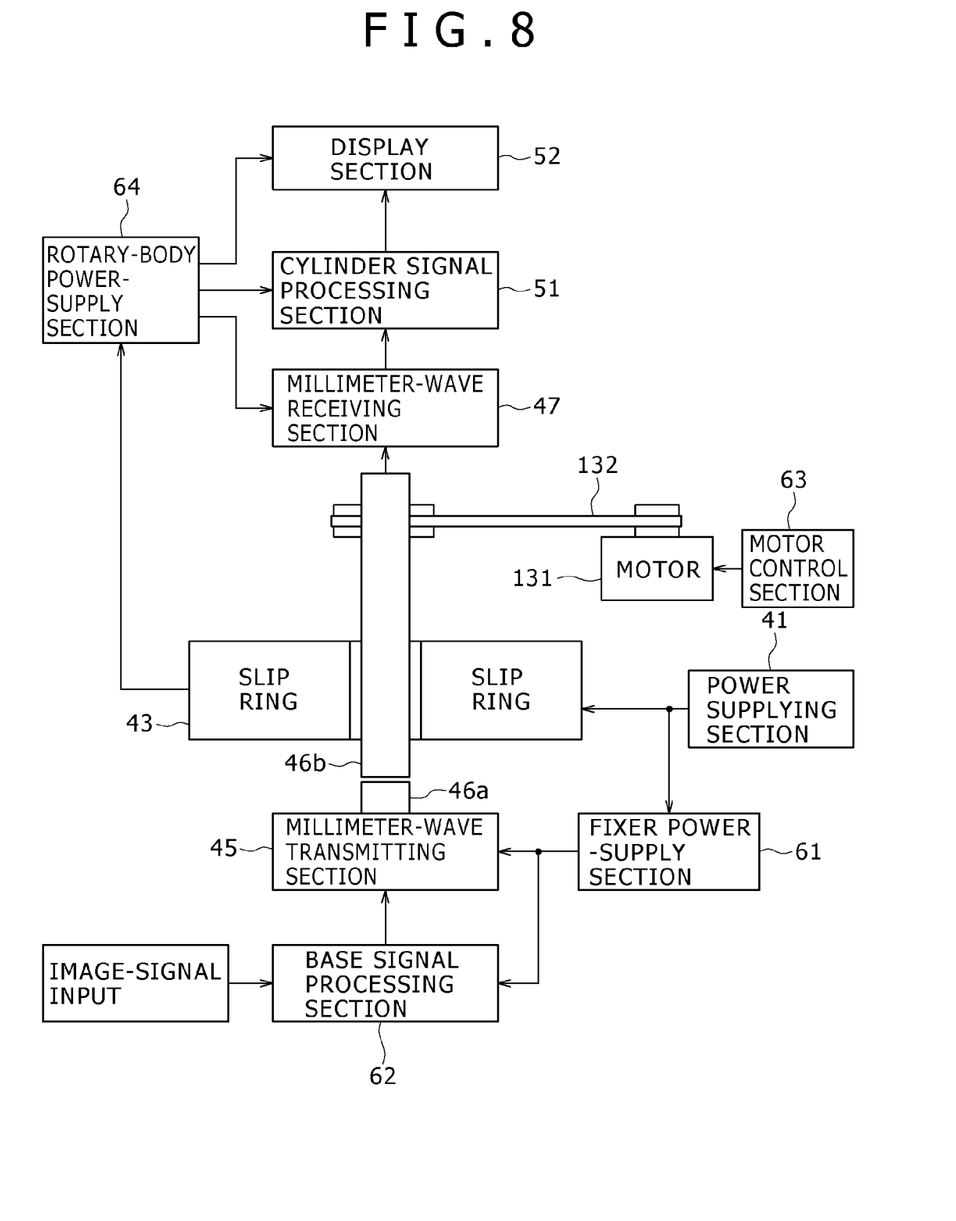
FIG. 8 is a block diagram showing second typical internal configurations of the cylindrical section and the base.

FIG. 8 is a block diagram showing the second typical internal configurations of the cylindrical section 32 and the base 31. In the case of the second typical internal configurations, a motor 131 is employed outside the cylindrical section 32 to serve as a substitute for the aerial motor 44 employed in the first typical internal configurations shown in FIG. 3 and the other figures. By delivering rotation driving power generated by the motor 131 to the cylindrical section 32 through a belt 132, the cylindrical section 32 can be driven into rotation. It is to be noted that, in place of the belt 132, a gear can be used as a power transfer section. Since configurations of the sections other than the motor 131 and the belt 132 are identical with those of the first typical internal configurations, the explanation of the configurations of the other sections is not repeated.

Since the price of the motor 131 is low in comparison with the aerial motor 44 employed in the first typical internal configurations, the cost of the entire-circumference 3-dimensional image display apparatus 30 can be reduced. In addition, since the motor 131 is employed outside the cylindrical section 32, in the event of a motor failure or the like, the failing motor 131 can be replaced with another one easily in comparison with the aerial motor 44.

The first modified version shown in FIG. 5 and the second modified version shown in FIG. 7 can also be applied to the second typical internal configurations.

In addition, the technical term 'system' used in this specification of the present disclosure is intended to imply a whole apparatus including a plurality of partial apparatus.

It is to be noted that implementations of the present disclosure are by no means limited to the embodiments described above. That is to say, the embodiments can be further changed to other modified versions within a range not deviating from essentials of the present disclosure.

The present application contains subject matter related to that disclosed in Japanese Priority Patent Application JP 2010-234503 filed in the Japan Patent Office on Oct. 19, 2010, the entire content of which is hereby incorporated by reference.

What is claimed is:

1. A signal transmission apparatus for transmitting a signal to a signal processing section provided inside a rotated rotary body, said signal transmission apparatus comprising:
a waveguide tube on a rotating shaft of said rotary body;
a signal transmitting section outside said rotary body to transmit said signal through said waveguide tube;
a signal receiving section inside said rotary body to receive said signal transmitted by said signal transmitting section through said waveguide tube and supply said signal to said signal processing section;
a slip ring configured to be rotated along with said rotary body around said waveguide tube; and
a motor inside said rotary body and configured to rotate said rotary body and said slip ring around waveguide tube.

2. The signal transmission apparatus according to claim 1, wherein said signal transmission apparatus has a power-line joining section for joining power lines between said slip ring and said signal processing section in a non-fixed manner.

3. The signal transmission apparatus according to claim 1, wherein said signal transmitting section and said signal receiving section communicate using millimeter waves.

4. The signal transmission apparatus according to claim 3, wherein said signal transmission apparatus has a polarized-wave conversion section inside said waveguide tube to serve as a section for changing the polarized-wave direction of said signal communicated between said signal transmitting section and said signal receiving section.

5. A signal transmission apparatus for transmitting a signal to a signal processing section provided inside a rotated rotary body, said signal transmission apparatus comprising:
a waveguide tube provided on a rotating shaft of said rotary body;
a slip ring configured to be rotated along with said rotary body; and
a motor inside said rotary body to rotate said rotary body and said slip ring.

6. The signal transmission apparatus according to claim 5, wherein said signal transmission apparatus has a power-line joining section for joining power lines between said slip ring and said signal processing section in a non-fixed manner.

7. The signal transmission apparatus according to claim 5, wherein a signal transmitting section and a signal receiving section communicate using millimeter waves.

8. The signal transmission apparatus according to claim 7, wherein said signal transmission apparatus has a polarized-wave conversion section inside said waveguide tube to serve as a section for changing the polarized-wave direction of said signal communicated between said signal transmitting section and said signal receiving section.

9. The signal transmission apparatus according to claim 5, wherein the motor is configured to rotate said body and slip ring through a power transfer section.

10. The signal transmission apparatus according to claim 5, further comprising a power supplying section outside of said rotary body to supply power to said signal processing section through said slip ring.

11. A display apparatus comprising:
a display section inside a rotated rotary body;
a signal processing section inside said rotated rotary body to serve as a section for supplying an image signal to said display section;
a waveguide tube on the rotating shaft of said rotary body;
a slip ring configured to be rotated along with said rotary body; and
a power supplying section outside of said rotary body to supply power to said display section and said signal processing section through said slip ring.

12. The display apparatus according to claim 11, further comprising a motor inside said rotary body and configured to rotate said rotary body and said slip ring.

13. The signal transmission apparatus according to claim 12, wherein said motor is configured to rotate said body and slip ring through a power transfer section.

14. The display apparatus according to claim 11, further comprising
a signal transmitting section outside of said rotary body to transmit said image signal through said waveguide tube, and
a signal receiving section inside said rotary body to receive said image signal transmitted by said signal transmitting section through said waveguide tube and supply said image signal to said signal processing section.

* * * * *